June 10, 1952     F. BUJAKY     2,599,973
SLIP-ON FISHLINE SINKER
Filed Sept. 17, 1948
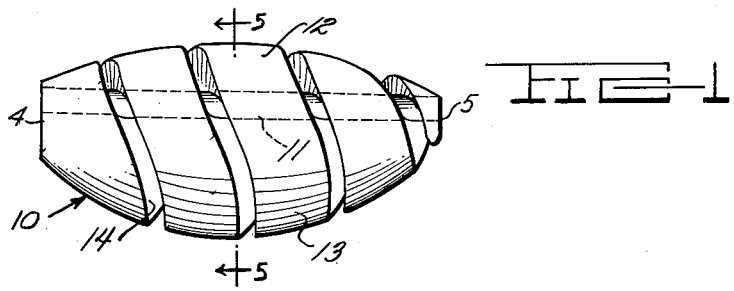
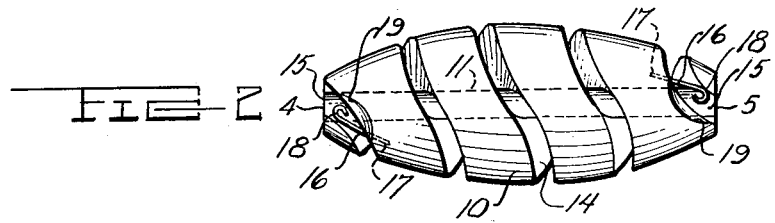
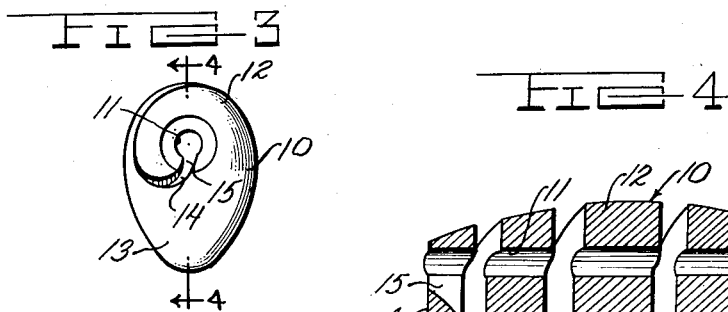
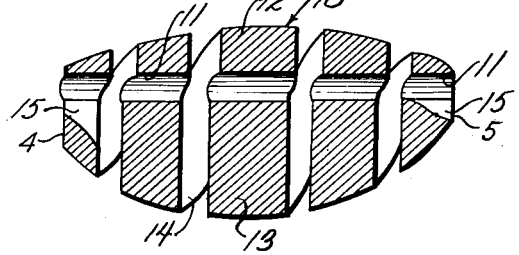
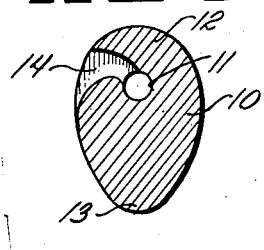
INVENTOR.
FRANK BUJAKY
BY
*McMorrow, Berman & Davidson*
ATTORNEYS Patented June 10, 1952

2,599,973

UNITED STATES PATENT OFFICE 2,599,973

SLIP-ON FISHLINE SINKER

Frank Bujaky, Miami Beach, Fla.

Application September 17, 1948, Serial No. 49,742

3 Claims. (Cl. 43—43.1)

My invention relates to sinkers for fish lines, and more particularly to such sinkers as are readily detachably connectible to a fish line without being tied thereon. As is well known, when fishing in a current, the fisherman frequently is unable to determine at first what weight of sinker is needed to anchor his line on the bottom without dragging. The only practical way of ascertaining the proper weight sinker is to actually test the line with sinkers of different weights. Thus, where several tests must be made, considerable time is lost untying sinkers having too light a weight from the line and attaching a heavier sinker thereto.

With the foregoing in view, it is an object of my invention to provide an improved sinker including means for readily detaching and connecting the same to a fish line.

A further object is to provide an improved sinker which is readily detachable and connectible to a fishing line without the use of knots or the like and which includes an elongated body formed with longitudinally-extending bore openings therethrough, and wherein said body is provided with a helical slot of more than one turn opening into said bore openings and comprising means for inserting a fishing line into said bore.

A further object is to provide in a sinker such as that last described means for preventing the withdrawal of said line from said bore into said slot.

Other objects and advantages reside in the particular structure of the invention, combination and arrangement of the several parts of the device, and will be readily apparent to those skilled in the art upon reference to the attached drawing in connection with the following specification, in which the invention is shown, described and claimed.

In the drawing:

Figure 1 is an elevational view of a preferred form of the invention;

Figure 2 is a bottom plan view showing a slight modification of the invention;

Figure 3 is an end elevation of the sinker of Figure 1;

Figure 4 is a longitudinal vertical sectional view taken substantially on the plane of the line 4—4 of Figure 3;

Figure 5 is a transverse vertical sectional view taken substantially on the plane of the line 5—5 of Figure 1.

Referring specifically to the drawing, wherein like reference characters have been used throughout the several views to designate like parts, and referring at first to both forms of the invention, 10 designates the solid longitudinally elongated or cigar-shaped body of a sinker having flat ends 4 and 5. The body 10 is formed with a series of smooth longitudinal cylindrical bore openings 11 extending therethrough and through the flat ends 4 and 5 and which are adapted to freely receive a fishing line, not shown, therein. As is clearly shown in Figures 3 and 5, the body portion 10 is of oval configuration but obviously may assume other forms. Likewise, in all forms of the invention it is preferred that the bore openings 11 be upwardly offset relative to the longitudinal axis or center of gravity of the body 10 or eccentrically positioned in the body 10. The purpose of this arrangement is to provide a relatively light upper body portion 12 and a relatively heavy lower body portion 13. The exterior of the body 10 of the sinker is formed with a spiral helical slot 14 which is composed of convolutions opening into the bore openings 11. The slot 14 has terminal ends 15 adjacent the flat body ends 4 and 5, the terminal ends 15 being laterally inwardly directed and each opening into the adjacent bore opening 11 and through the adjacent one of the flat body ends 4 or 5. The terminal ends 15 of the slot 14 open into the adjacent bore openings 11 from the under side thereof. The purpose of this arrangement is that the weight of the heavy lower portion 13 of the body will cause the fishing line to normally bear against the upper surface of the bore 11, whereby accidental disengagement of the fishing line through the open ends 15 of the slot is prevented. This is a particularly desirable feature in the form of the invention illustrated in Figures 1, 3, 4 and 5, wherein the ends 15 of the slots are unobstructed.

However, this is not an essential feature of the form of invention illustrated in Figure 2, wherein detents have been provided to normally close the convolution of the slot 14 adjacent each of the terminal ends 15 thereof. In this form of the invention, there is provided a pair of detents 16 which may comprise spring wires, each wire extending across the convolution of the slot 14 adjacent the terminal end thereof and having one end 17 secured in any suitable manner, as by being embedded in a wall of said convolution and having the other or free end 18 normally resiliently engaging the opposite wall of said convolution and readily yieldable when a fishing line is forced into the bore opening 10 through the terminal ends of the slot 14. It will be noted that this arrangement will be relatively unyieldable when engaged by a fishing line attempting to leave the bore openings 11. At the same time, when it is desired to withdraw a fishing line from the bore openings 11 it is a simple matter to depress the wires into any suitable recesses 19 formed in the above mentioned convolutions of the slot, whereby to permit free passage of the fishing line out of the bore openings 11.

As is obvious from the foregoing, the last-mentioned form of the invention need not be provided with light upper body portions 12 and heavy lower body portions 13, although such form is, as aforesaid, desirable. Moreover, while I have shown and described what is now thought to be the preferred embodiments of the invention, it is to be understood that the same is susceptible of other forms and expressions. Consequently, I do not limit myself to the precise structures shown and described hereinabove except as hereinafter claimed.

I claim:

1. A fishing line sinker comprising a solid longitudinally elongated, cigar-shaped body having flat ends, said body being formed with a series smooth longitudinal cylindrical bore openings extending therethrough and through said flat end and having a spiral helical slot formed in the exterior of said body composed of convolutions open into said bore openings, said helical slot having terminal ends adjacent to said flat body ends, said terminal ends being laterally inwardly directed and opening into said bore openings, and opening through said flat body ends, said bore openings being eccentrically positioned in said body to define an upper portion of less weight and mass than the portion below the bore openings, and said laterally inwardly directed terminal ends of said slot opening into said bore openings from the underside thereof.

2. A fishing line sinker comprising a solid longitudinally elongated, cigar-shaped body having flat ends, said body being formed with a series of smooth longitudinal cylindrical bore openings extending therethrough and through said flat ends and having a spiral helical slot formed in the exterior thereof composed of convolutions opening into said bore openings with the convolution adjacent to each of the flat ends terminating and opening through the adjacent flat end, said bore openings being eccentrically positioned in said body to define an upper portion of less weight and mass than the portion below said bore openings.

3. A fishing line sinker comprising a solid longitudinally elongated, cigar-shaped body having flat ends, said body being formed with a series of smooth longitudinal cylindrical bore openings extending therethrough and through said flat ends and having a spiral helical slot formed in the exterior thereof composed of convolutions opening into said bore openings with the convolution adjacent to each of the flat ends terminating and opening through the adjacent flat end, said bore openings being eccentrically positioned in said body to define an upper portion of less width and mass than the portion below the bore openings, and a resilient detent extending across the convolution of said slot adjacent each of the flat ends of said body and having one end secured to a wall of said convolution and having the other end yieldably engageable with the opposite wall of said convolution.

FRANK BUJAKY.

REFERENCES CITED

The following references are of record in the file of this patent:

UNITED STATES PATENTS

| Number | Name | Date |
|---|---|---|
| D. 107,418 | Ganaway | Dec. 14, 1937 |
| 525,770 | Parker | Sept. 11, 1894 |
| 1,698,027 | Seurynck | Jan. 8, 1929 |
| 1,848,600 | Best | Mar. 8, 1932 |
| 1,883,574 | Cleeland | Oct. 18, 1932 |
| 2,425,069 | Metzler | Aug. 5, 1947 |
| 2,459,287 | Robbins | Jan. 18, 1949 |
| 2,501,634 | Rector | Mar. 21, 1950 |

FOREIGN PATENTS

| Number | Country | Date |
|---|---|---|
| 464 | Great Britain | of 1899 |
| 818,314 | France | June 14, 1937 |